United States Patent
Feinbloom et al.

(10) Patent No.: US 11,119,309 B1
(45) Date of Patent: Sep. 14, 2021

(54) MAGNIFICATION DEVICES WITH FILTERING AND METHOD FOR SELECTION OF SAID FILTERS

(71) Applicant: Designs for Vision, Inc., Bohemia, NY (US)

(72) Inventors: Richard E. Feinbloom, New York, NY (US); Liviu Steier, Needham, MA (US); Kenneth N. Braganca, Sayville, NY (US)

(73) Assignee: Designs for Vision, Inc., Bohemia, NY (US)

( * ) Notice: Subject to any disclaimer, the term of this patent is extended or adjusted under 35 U.S.C. 154(b) by 0 days.

(21) Appl. No.: 17/129,389

(22) Filed: Dec. 21, 2020

Related U.S. Application Data

(63) Continuation of application No. 16/867,489, filed on May 5, 2020, now Pat. No. 10,895,735.

(51) Int. Cl.
| | |
|---|---|
| *G02C 9/00* | (2006.01) |
| *G02B 25/00* | (2006.01) |
| *G02B 27/02* | (2006.01) |
| *G02B 25/02* | (2006.01) |
| *G02B 5/22* | (2006.01) |
| *G02B 5/26* | (2006.01) |

(52) U.S. Cl.
CPC .......... *G02B 25/008* (2013.01); *G02B 5/223* (2013.01); *G02B 25/004* (2013.01); *G02B 25/02* (2013.01); *G02B 27/025* (2013.01); *G02C 9/00* (2013.01); *G02B 5/22* (2013.01); *G02B 5/26* (2013.01)

(58) Field of Classification Search
None
See application file for complete search history.

(56) References Cited

U.S. PATENT DOCUMENTS

| | | | |
|---|---|---|---|
| 2,986,969 | A | 6/1961 | Muncheryan |
| 3,273,456 | A | 9/1966 | Feinbloom |
| 3,519,339 | A | 7/1970 | Hutchinson |
| 4,089,117 | A | 5/1978 | Villarreal |
| 4,511,225 | A | 4/1985 | Lipson |
| 5,162,647 | A | 11/1992 | Field, Jr. |
| 5,558,836 | A | 9/1996 | Rounbehler |
| 5,751,340 | A | 5/1998 | Strobl |
| 6,697,195 | B2 | 2/2004 | Weber |
| 7,008,074 | B1 | 3/2006 | Halm |
| 7,477,451 | B2 | 1/2009 | Katz |
| 7,532,394 | B2 | 5/2009 | Gebelein |

(Continued)

OTHER PUBLICATIONS

"A Multi-Detection Fluorescence Dye with 5-ALA and ICG Using Modified Light Emitting Diodes," Yoon, K, et. al, Current Optics and Photonics, vol. 3, No. 3, Jun. 2019, pp. 256-262.

*Primary Examiner* — Darryl J Collins
(74) *Attorney, Agent, or Firm* — Law Office of Carl Giordano, PC

(57) ABSTRACT

A method for determining filtering capabilities of a magnification device suitable for providing protection from light when viewed through the magnification device is disclosed. The filtering capability of the magnification device is determined based at least one of an input power of the inputted light signal, a magnification level of the magnification device and an orientation of the filtering within the magnification device. Further disclosed is an lighting system that generates a light, which when reflected into the magnification device is prevent from causing damage to a user's eyes based on the selection of the filtering system disclosed herein.

9 Claims, 5 Drawing Sheets

(56) References Cited

U.S. PATENT DOCUMENTS

| | | |
|---|---|---|
| 8,120,847 B2 | 2/2012 | Chang |
| 8,215,791 B2 | 7/2012 | Feinbloom |
| 9,791,138 B1 | 10/2017 | Feinbloom |
| 10,061,115 B2 | 8/2018 | Feinbloom |
| 10,132,483 B1 | 11/2018 | Feinbloom |
| 10,215,977 B1 | 2/2019 | Feinbloom |
| 10,240,769 B1 | 3/2019 | Braganca |
| 10,437,041 B1 | 10/2019 | Feinbloom |
| 2001/0005281 A1 | 6/2001 | Yu |
| 2002/0067560 A1 | 6/2002 | Jones |
| 2002/0097230 A1 | 7/2002 | Lowry |
| 2003/0002036 A1 | 1/2003 | Haan |
| 2007/0047073 A1 | 3/2007 | Zimmer |
| 2008/0219654 A1 | 9/2008 | Border |
| 2009/0073558 A1 | 3/2009 | Jacobs |
| 2010/0053540 A1 | 3/2010 | Blayden |
| 2010/0210951 A1 | 8/2010 | Rahman |
| 2010/0305436 A1 | 12/2010 | Chen |
| 2011/0270035 A1 | 11/2011 | Gono |
| 2012/0120636 A1 | 5/2012 | Wilt |
| 2014/0036356 A1 | 2/2014 | Feinbloom |
| 2014/0210972 A1 | 7/2014 | On |
| 2015/0253589 A1 | 9/2015 | Finkman |

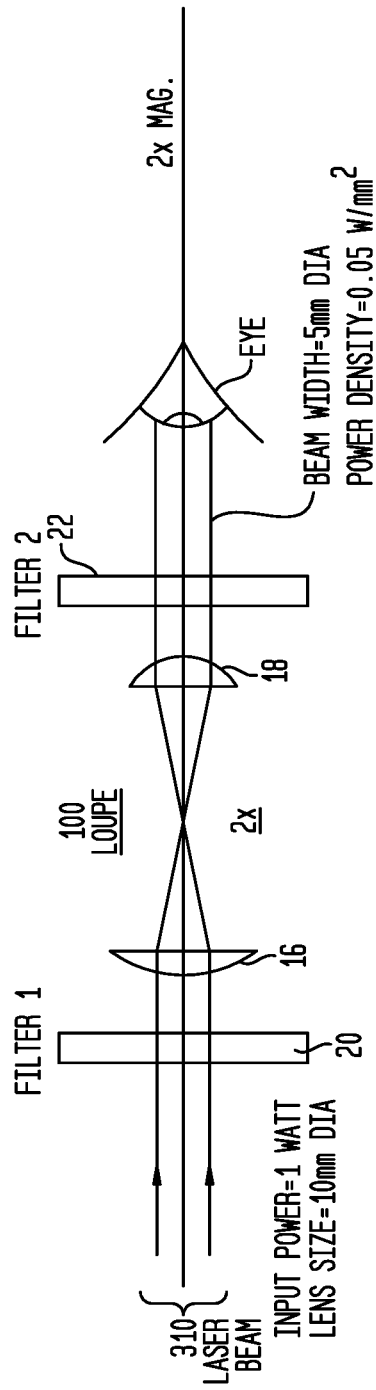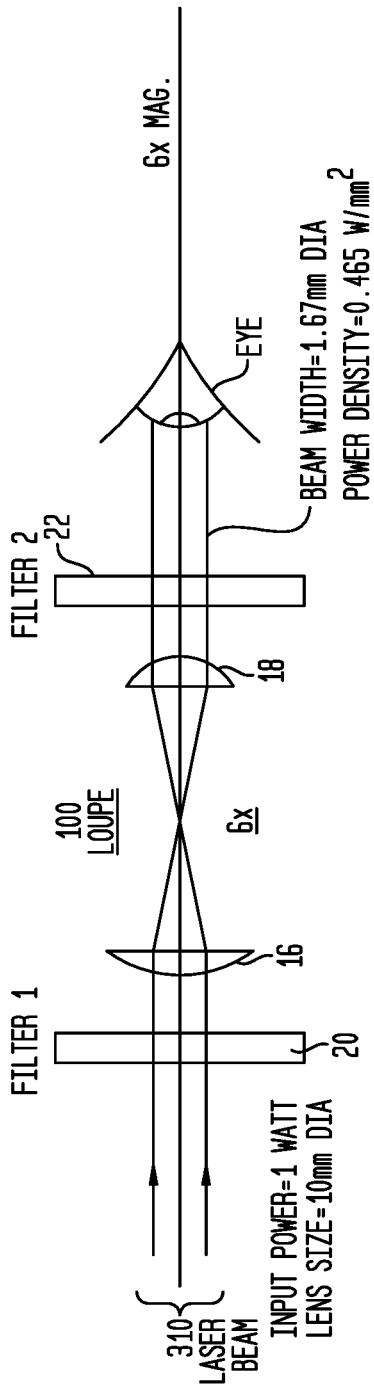

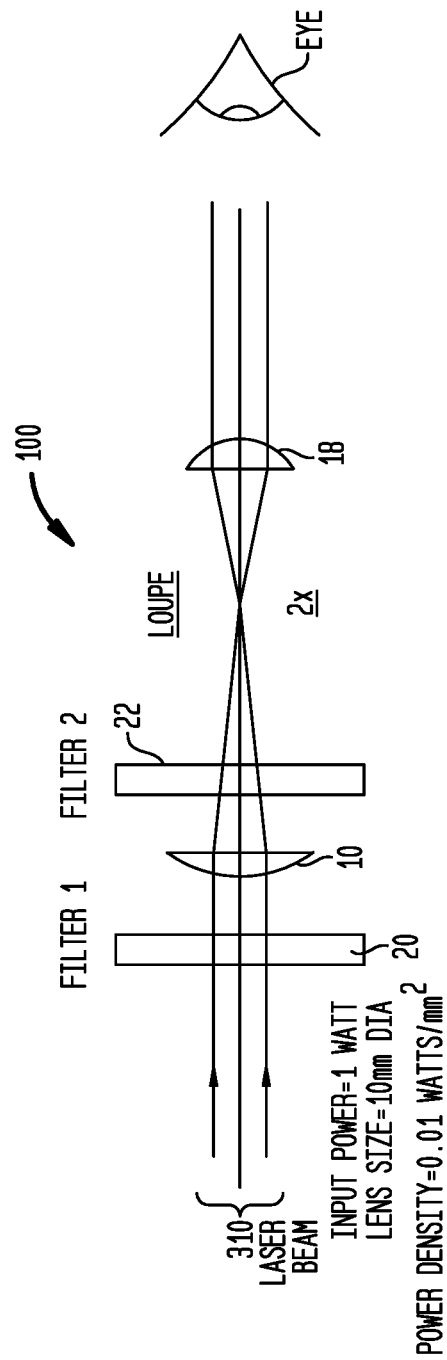

MAGNIFICATION DEVICES WITH FILTERING AND METHOD FOR SELECTION OF SAID FILTERS

CLAIM OF PRIORITY

This application claims, pursuant to 35 USC 103, as a Continuation Application, priority to and the benefit of the earlier filing date of that patent application filed in the USPTO on May 5, 2020 and afforded Ser. No. 16/867,489, the contents of which are incorporated by reference, herein.

RELATED APPLICATIONS

This application is related to the teaching of U.S. Pat. Nos. 7,690,806; 8,215,791; RE46463, U.S. Pat. Nos. 9,791,138; 10,061,115; USP 10, 132,483; USP 10,215, 977; USP 10, 240, 769; and USP 10,437,041, which are assigned to the Assignee of the instant application, and whose contents are incorporated by reference, herein.

BACKGROUND OF THE INVENTION

Field of the Invention

The invention relates generally to optical devices, and more particularly, to optical magnification devices for use in the presence of a source of electromagnetic radiation.

Background Information

Light Emitting Diodes (LEDs), whether lasing or non-lasing, (referred to herein as LED) have found utility in the fields of surgery, medicine, and dentistry to provide illumination on the work area of the doctor, surgeon or dentist. Specialized lighting devices having also found use in distinguishing healthy tissue from diseased tissue. For example, in the field of dental procedures, fluorescence based methods are often used to provide an objective assessment of a carious process. Fluorescence is a form of photoluminescence and is defined as the absorption of UV light (10 to 400 nm—invisible light) by an object and its spontaneous emission at longer wavelengths (380-700 nm—visible light). Auto-fluorescence of teeth is based on the presence of endogenous fluorophores residing in the enamel and dentine. An example of an LED UV illumination system is the Cobra Ultra Vision produced by Gnatus Medical Dental Equipments Ltd. Brazil, that uses UV light generated by LEDs.

Similarly, in surgery and medicine, fluorescence may be used to distinguish tumors from healthy cells to afford doctors and surgeons to guide operations to remove tumors.

However, UV light (or electromagnetic radiation), for example, emitted from an LED may be extremely intense and highly collimated when used during a medical or dental procedure and the surgeon or dentist must wear an eye protection device or safety glasses to avoid damage to their eyes as the UV wavelength emitted by the LED can cause significant damage to the eyes.

This protection is particularly critical when magnification devices are used by doctors and dentists during procedures, for the purpose of magnifying the work area. The magnification devices used may include telescopes, microscopes, endoscopes, and eye-loupes.

In such cases, exposure to light in the UV (1 to 400 nm), visible (380 nm to 700 nm) and near-infrared (700 nm to 1400 nm) regions of the spectrum (retinal hazard region), particularly when viewed through magnifying optical devices may damage the retina, as the power density of the light being viewed through the magnifying devices is concentrated by the magnification.

Accordingly, there remains a need in the industry for eye protection when using optical magnification devices in the presence of a radiation-emitting source.

SUMMARY OF THE INVENTION

Briefly described, according to an aspect of the invention, is a magnification device including a housing containing an optical system including at least one objective lens mounted in the housing adjacent a distal end, and at least one eye lens mounted in the housing adjacent a proximal end, wherein the combination of the objective lens and the eye lens achieves a known level of magnification, and a filtering system comprising a first filter configuration mounted adjacent to the distal end of the housing and a second filter configuration mounted adjacent the proximal end, the first filter system comprises at least one characteristic determined based at least on the level of magnification of the magnification device and the second filter system comprises at least one characteristic determined based on the at least one characteristics of the first filter system.

According to another aspect of the invention, a vision enhancing assembly includes a carrier device, one or more magnification devices coupled to the carrier device, each of the magnification devices configured to achieve a level of magnification, and a filtering system in the magnification devices having a first filter system possessing characteristics based on at least on the magnification level and a second filter system possessing characteristics based on at least on the characteristics of the first filter system.

BRIEF DESCRIPTION OF THE DRAWINGS

The advantages, nature, and various additional features of the invention will appear more fully upon consideration of the illustrative embodiments now to of the described in detail in connection with accompanying drawings, where like reference numeral to identify like element throughout the drawings:

FIGS. 3A and 3B illustrate cross-sectional views of a first aspect of an exemplary magnification device in accordance with the principles of the invention.

FIG. 4 illustrates a second aspect of an exemplary magnification device in accordance with the principles of the invention.

Figure 1:
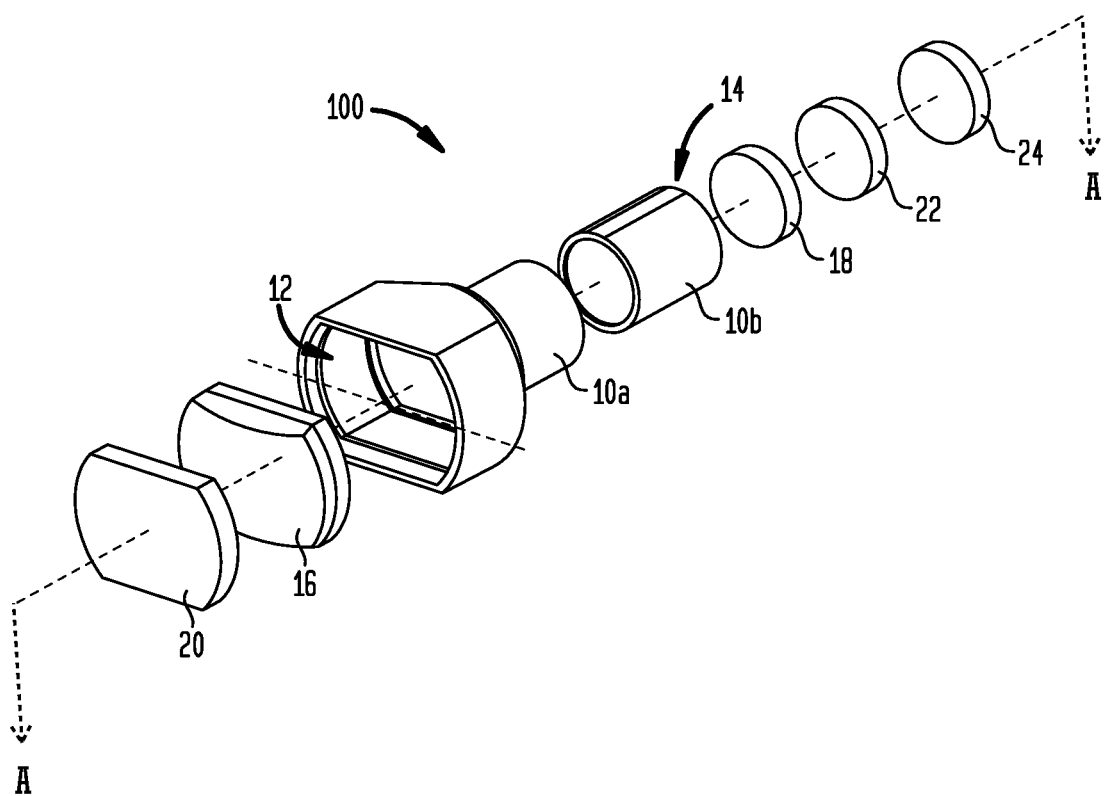
FIG. 1 illustrates an exploded perspective view of a magnification device according to an aspect of the invention.

It is to be understood that the drawings of the invention are not to scale. The drawings are intended to depict only typical aspects of the invention, and therefore should not be considered as limiting the scope of the invention. In the drawings, like numbering represents like elements between the drawings.

It is to be understood that the figures and descriptions of the present invention described herein have been simplified to illustrate the elements that are relevant for a clear understanding of the present invention, while eliminating, for purposes of clarity, many other elements. However, because these omitted elements are well-known in the art, and because they do not facilitate a better understanding of the present invention, a discussion of such elements are not provided herein. The disclosure, herein, is directed also to variations and modifications known to those skilled in the art.

DETAILED DESCRIPTION OF THE INVENTION

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

FIG. 1 illustrates a magnification device 100 according to an aspect of the invention. In this illustrated aspect of the invention, separate housing portions 10a and 10b are provided to allow for the precise placement of the objective lens(es) 16 and the eye lens(es) 18 prior to assembly. The housing portions 10a and 10b are formed of a relatively rigid and lightweight plastic material. Housing portion 10a, in this aspect of the invention, includes a Galilean optical system with one or more objective lenses 16 mounted in housing 10a adjacent the distal open end 12. The objective lens(es) 16 may include, but are not limited to, convex, biconvex, plano convex, doublet plano-convex, doublet bi-convex, double convex crown and concave flint, and other suitable precision magnification lenses.

According to an aspect of the invention, there may be one, two, or three objective lenses 16 present. The device 100 illustrated in FIG. 1 includes two lenses that are coupled together to form the objective lens 16. The resulting achromat lens 16 minimizes chromatic aberration. According to an aspect of the invention, the objective lens(es) 16 may be substantially rectangular. When a rectangular objective lens 16 is employed, a wider field of view is obtained, as more light is allowed to enter the device. According to another aspect of the invention, the objective lens(es) 16 may be substantially circular.

As shown in FIG. 1, the Galilean optical system further includes one or more eye lens(es) 18 mounted in housing portion 10b adjacent the proximal end 14 thereof. The eye lens(es) 18 may include, but are not limited to, concave, biconcave, plano-concave, negative, diverging, and other suitable precision magnification lenses. According to an aspect of the invention, the eye lens(es) 18 may be bi-concave, or negative.

Figure 2:
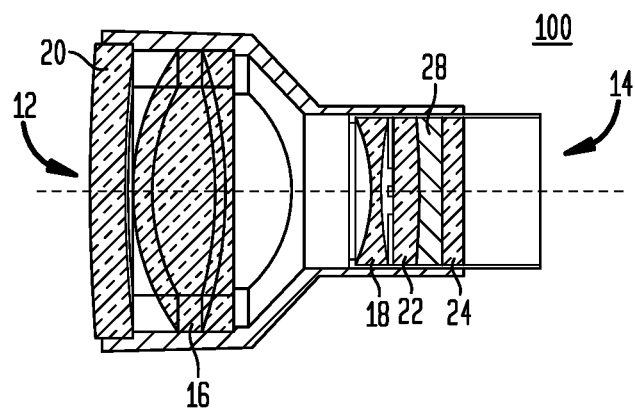
FIG. 2 illustrates a cross-sectional, through section A-A, assembled view of the device illustrated in FIG. 1.

The magnification device 100 illustrated in the exploded view of FIG. 1 is shown assembled in FIG. 2, taken along sectional line A-A. As needed, a lens 24, for spectacle correction may be present in the magnification device 100 and mounted in housing portion 10b adjacent the proximal end 14. To the extent a spectacle correction lens is unnecessary, the lens 24 may be plano. Regardless of which type of lens 24 is included in the device 100, the spectacle correction or plano lens closes the proximal end 14 of the housing portion 10b. Lenses 16, 18, and 24 and filters 22 and 20 are mounted in the housing with an epoxy or other suitable adhesive.

Advantageously, the filtering system according to the invention blocks or filters the transmission of harmful electromagnetic radiation while being transparent to allow for visible light transmission.

The filtering system, illustrated in FIG. 1, includes a first filter system (i.e., a lens, a filter) 20 mounted to, and closes, the distal open end 12 of the housing 10a. The exterior filter lens 20 attenuates inputted light (i.e., electromagnetic radiation) to a first level based on the attenuation level of the filter 20. However, some residual radiation is still transmitted through the magnification device 100. As the residual radiation is transmitted through the optical system, the residual radiation is magnified to a level that may become dangerous.

To attenuate the magnified residual radiation, the filtering system also includes a second filter system (i.e., a lens, a filter) 22 mounted adjacent to the proximal open end 14 of housing 10b. In one aspect of the invention, the second filter lens 22 is contained within the interior of housing 10b (i.e., internal to eye lens). In another aspect of the invention, the second filter lens 22 is mounted external to the housing 10b (i.e., external to eye lens).

There are many different types of LEDs available on the market suitable for use, some of which are capable of emitting more than one wavelength. Thus, the type of filters 20, 22 suitable for use according to the invention depends upon the radiation-emitting device being viewed through the magnification device 100. For example, to prevent damage from a light transmitting beams at wavelengths less than 500 nm requires a filtering system that blocks wavelengths in the above-described range while allowing wavelengths in a visible range to be viewable.

Based upon the LED used, the application, and the manner in which the LED is used, a protection factor, i.e. the Optical Density (OD), of the filters may be determined to reduce the magnitude or intensity of the light exiting magnification device 100. Filters suitable for use according to the invention are available from NoIR Laser Company, L.L.C. of South Lyon, Mich. and/or Honeywell Safety Products, Smithfield R.I. The filters 20 and 22 may suitably be formed of polycarbonate, glass or other suitable materials.

Although, the invention has been described with regard to a Galilean magnification system (FIG. 1), it would be understood that the principles of the invention presented, herein, are also applicable to a Keplerian type optical system that operates to magnify an incoming lighting. Keplerian optical systems are advantageous as they provide a wider field of view than a Galilean system. However, Galilean optical systems are lighter in weight than Keplerian optical systems.

In accordance with the principles, the protective characteristics (e.g., optical density) of the filter system may be determined based on a light signal having an expected input power, and an expected reduction of the inputted light signal while insuring adequate visibility of the non-filtered region.

FIGS. 3A and 3B illustrate cross-sectional views of exemplary magnification devices having a 2× optical magnification and a 6× optical magnification, respectively.

With reference to FIG. 3A, input light of known power is inputted into a first filter system (20) prior to entering the magnification device 100. Filter 20 is, in this exemplary case, set to 10 mm (millimeters) and defines the input beam width of the input light.

Filter 20 reduces a magnitude (or an intensity or a power level) of the input light by a known factor, which is determined by the filtering capability of filter 20. For example, when filter 20 is an absorptive filter, the filtering capability is based on the ability of filter 20 to attenuate or reduce in magnitude light wavelengths of a known range.

However, when filter 20 is a reflective filter, the filtering capability is based on the ability of filter 20 to reflect light wavelengths of a known range. In this case of reflective filtering, the term "attenuate" means that the wavelengths within the known range are reduced in magnitude (or intensity or power level) by the reflection of such wavelengths by the reflective characteristic of filter 20.

In this illustrated example, input light signal 310 enters the first filter system 20, which is configured to reduce a magnitude of the input light within a known wavelength region by a known factor. The light passing through filter 20 (i.e., the residual light) is then magnified by magnification device 100 and the magnified residual light exits the magnification device 100.

In accordance with well-known principles within the optical field, the beam-width characteristics of the input light passing objective lens 16 is effected by the magnification level. In this illustrated cases, wherein the magnification level is set to a magnification level of 2 (i.e., 2×), the beam-width characteristics of the light passing the objective lens (i.e., the residual light) is reduced to a 5 mm diameter, as the input light possesses a 10 mm diameter.

Considering a 1 watt input power over a 10 mm diameter beam-width, the input power density to magnification device 100 is 0.01 watts/mm². In the case of first filter 20 and second filter 22 are totally transparent and lacking any filtering capability (i.e., 100% transmissive), the power density of the light exiting magnification device 100, may be determined as:

$$\text{Output beam diameter} = \text{input beam diameter/magnification level} = 10/2 = 5 \text{ MM} \quad (1)$$

$$\text{Power density} = \text{residual power/area} = 1 \text{ W}/(3.14 \times (2.5)^2) = 0.05 \text{ W/mm}^2$$

Referring to FIG. 3B, which illustrates a similar magnification device setup wherein the magnification device possesses a 6× magnification level, a determination of the power density of the light exiting magnification device 100 may be determined from equations 1 and 2 to be 0.465 W/mm². Hence, output power density reaching a user's eyes is significantly increased as the magnification level increases.

Similar determination of power density exiting the magnification device 100 may be determined for other magnification levels.

Table 1 illustrates exemplary power density outputs for magnification levels of 2×, 3.5× and 6.0× as a function of the filtering capability of first filter 20.

TABLE 1

| | | | Power density output v. Filtering capability | | | | |
|---|---|---|---|---|---|---|---|
| Input Power (Watts) | Input Pwr. Den.) (Watts/mm²) | F1 (percent absorption) | Residual Power (percentage) | Residual power (Watts) | 2X mag. Pwr. Den. (Watts/mm²) | 3.5X mag. Pwr. Den. (Watts/mm²) | 6.0X mag. Pwr. Den. (Watts/mm²) |
| 1.0 | 0.01 | 100 | 0 | 0 | 0 | 0 | 0 |
|  | 0.01 | 90 | 10 | .1 | .005 | 0.0146 | 0.046 |
|  | 0.01 | 80 | 20 | .2 | .010 | 0.029 | 0.092 |
|  | 0.01 | 70 | 30 | .3 | .015 | 0.043 | 0.138 |
|  | 0.01 | 60 | 40 | .4 | .02 | 0.058 | 0.184 |
|  | 0.01 | 50 | 50 | .5 | .025 | 0.072 | 0.230 |
|  | 0.01 | 40 | 60 | .6 | .03 | 0.087 | 0.276 |
|  | 0.01 | 30 | 70 | .7 | .035 | 0.101 | 0.322 |
|  | 0.01 | 20 | 80 | .8 | .040 | 0.116 | 0.368 |
|  | 0.01 | 10 | 90 | .9 | .045 | 0.131 | 0.414 |
|  | 0.01 | 0 | 100 | 1 | 0.050 | 0.145 | 0.460 |

As shown, the power density of a 2× loupe with F1 of 60 percent achieves an output power density of 0.03 W/mm², wherein a 6.0× loupe achieves a power density of 0.276 W/mm².

Hence, as the ability of first filter 20 to attenuate the input signal power decreases, the power density exiting the magnification device 100 increases and when the power density of the light exiting magnification device 100 exceeds a predetermined limit, second filter 22 is required to reduce or attenuate the exiting power density to be less than a predetermined value. In this case, the filtering capability of second filter 22 may be determined based at least on the filtering capability of the first filter 22. The predetermined power density limit may be based on well known standards established by safety organizations.

Table 2 illustrates the determination of an exemplary second filter 22 attenuation capability as a function of first filter 20 attenuation capability for a magnification device of 2.0× magnification level.

TABLE 2

Second filter filtering capability v. First filter filtering capability

| Input Pwr (Watt) | F1 (% Absorb.) | Residual power (Watts) | Input power to F2 | Pwr Den Input to F2 (Watt/mm$^2$) | F2 (% Absorb..) | Output Power/Den (Watt/mm$^2$) |
|---|---|---|---|---|---|---|
| 1 | 90 | 0.1 | 0.1 | 0.005 | | |
| | | | | | 90 | 0.0005 |
| | | | | | 80 | 0..001 |
| | | | | | 70 | 0.0015 |
| | | | | | 60 | 0.0020 |
| | | | | | 50 | 0.0025 |
| | | | | | 40 | 0.0030 |
| | | | | | 30 | 0.0035 |
| | | | | | 20 | 0.0040 |
| | | | | | 10 | 0.0045 |
| | | | | | 0 | 0.005 |
| | 20 | 0.8 | 0.8 | 0.04 | | |
| | | | | | 90 | 0.004 |
| | | | | | 80 | 0.008 |
| | | | | | 70 | 0.012 |
| | | | | | 60 | 0.016 |
| | | | | | 50 | 0.020 |
| | | | | | 40 | 0.024 |
| | | | | | 30 | 0.028 |
| | | | | | 20 | 0.032 |
| | | | | | 10 | 0.036 |
| | | | | | 0 | 0.04 |

Table 2: Second Filter Filtering Capability v. First Filter Filtering Capability As shown in Table 2, with an input power condition of 1 Watt into a 10 mm diameter lens, the filter characteristics of filter 22 may be determined for a first filter 20 having 90 percent attenuation and a 20 percent attenuation.

Similar determination of the filter characteristics of second filter 22 may be determined for other magnification levels. In addition, Table 2 illustrates the determination of at least one characteristic of second filter 22 based on a known input value. However, it would be appreciated that the at least one filter characteristic of second filter 22 may further be determined by the input power to, and the diameter of, first filter 20.

Accordingly, the operational characteristics (i.e., power density and filtering capability) of second filter 22 may be determined based on input signal power, the characteristics of first filter 20 and the magnification level of the optical device.

In another aspect of the invention, determination of second filter 22 filtering capability as a function of the position of second filter 22 with respect to eye lens 18 may be determined for each of the filter capability settings shown in Table 2.

FIG. 4 illustrates a second exemplary embodiment of the invention, wherein second filter 22 is placed prior to the magnification achieved by the magnification device. In this second exemplary embodiment, it may be determined the filtering capability required of second filter 22 sufficient to reduce the output power density through eye lens to a safe level (i.e., is less than the predetermined limit value)

Figure 5:
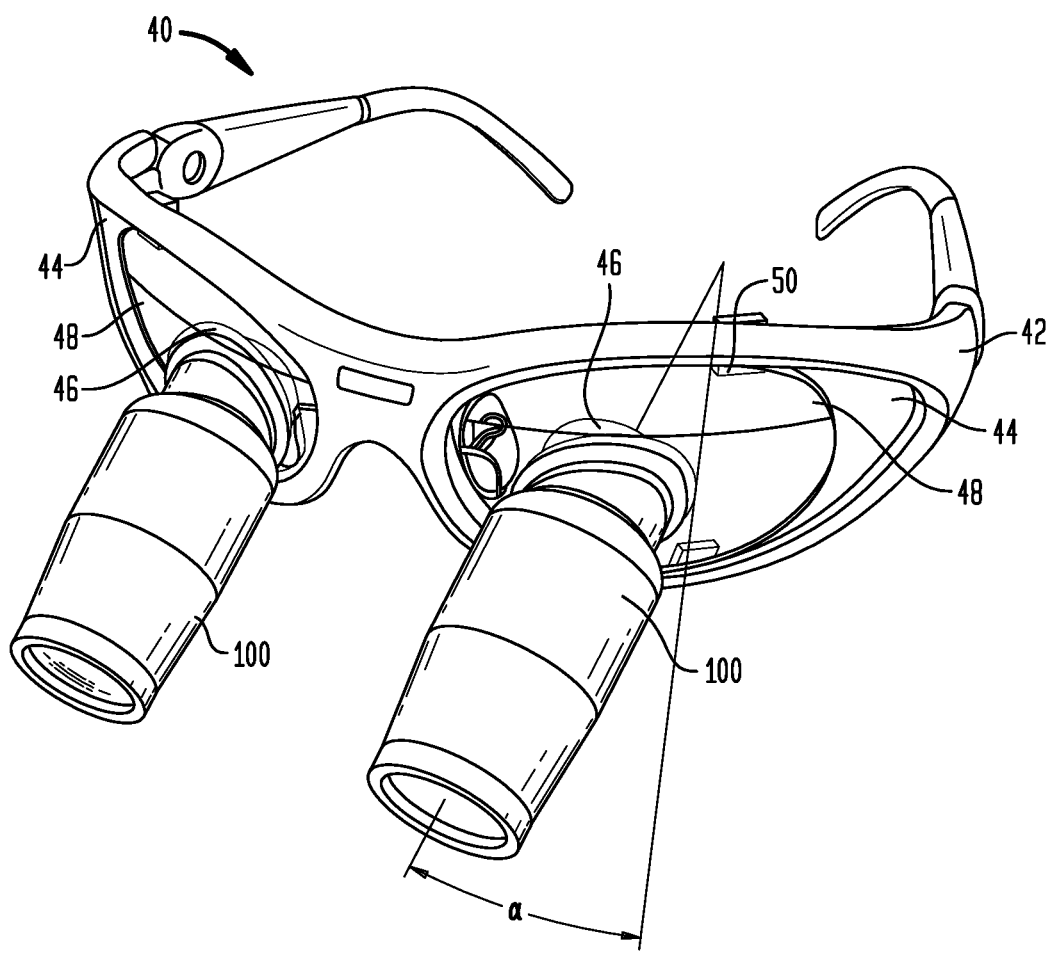
FIG. 5 illustrates a front elevational view of an assembly illustrating magnification devices in a carrier device.

FIG. 5 illustrates an exemplary, magnification devices 100 or loupes according to an aspect of the invention are illustrated disposed in a carrier device 40 to provide binocular vision to a user. The carrier device 40 in this aspect of the invention is a spectacle, or an eyeglass, comprising frame 42 with carrier lenses 44. Alternative carrier devices 40 may include headbands, goggles, visors, or other devices suitable for supporting the magnifying devices to provide binocular vision. The carrier lenses 44, each include an aperture 46 through which the magnification devices 100 are mounted. The carrier lenses 44 may be plano or prescription, and may be configured to prevent the transmission of harmful radiation by the used tinting or filtering of the inputted light. Additional supporting spectacle lenses 48 may be secured to the spectacle frame 42 by a clip 50 or other conventional means.

As illustrated, the magnification devices are positioned in the carrier lenses 44 at a selected angle of declination (a) to provide a user with ease of use, and to promote proper posture for the back, neck, head, and eyes that may be assumed when working at a close distance.

According to one aspect of the invention, the filtering system disclosed, herein, attenuates wavelengths from a radiation-emitting source, for example, an LED (i.e., an non-lasing LED or a lasing diode), in the range of about 190 to about 500 nm (UV light). It would be understood that additional wavelengths may be filtered and prevented from causing harm to a user's eyes as the above ranges of wavelengths are not meant to be exhaustive.

Advantageously, the magnification devices 100 having characteristics (i.e., power density and/or filtering capabilities) selected, in accordance with the principles of the invention to block, or attenuate, harmful wavelengths of radiation (e.g., UV, visible, infrared), and provide magnification at a one or more of a plurality of magnifications (e.g., 2.5×, 3.5×, 4.5×, and 6.0×). It should be understood that other magnifications may also be achieved.

As the different magnification levels provide different degrees of amplification of the reflected light, the optical density of the filters 20 and 22 may be determined as discussed above to provide adequate filtering capability to prevent damage to the eye caused by the reflected light.

In one aspect of the invention, a plurality of filters may be used as the filter 20 in the magnification device 100 disclosed, herein, wherein each of the plurality of filters (whether absorptive or reflective) has an optical density less than the required density value. As filtering capability is generally additive, the placement of the absorptive filter(s) may be distributed to provide a clearer image of the object being viewed. For example, two absorptive filters, each having an optical density 3 may be used as the filter 20 in the device shown in FIG. 1, to achieve an optical density of at least 5.

FIG. 5, incorporating magnification devices shown in FIG. 1, represents an aspect of the invention wherein first filter 20 is positioned before objective lens 16 and second filter 22 is positioned after eye lens 18. However, it would be understood that first filter 20 and second filter 22 may be positioned before objective lens 16 or behind the eye lens 18. Determination of the characteristics of first filter 20 and second filter 22 may be determined in a manner similar to that shown with regard to Table 2.

Figure 6:
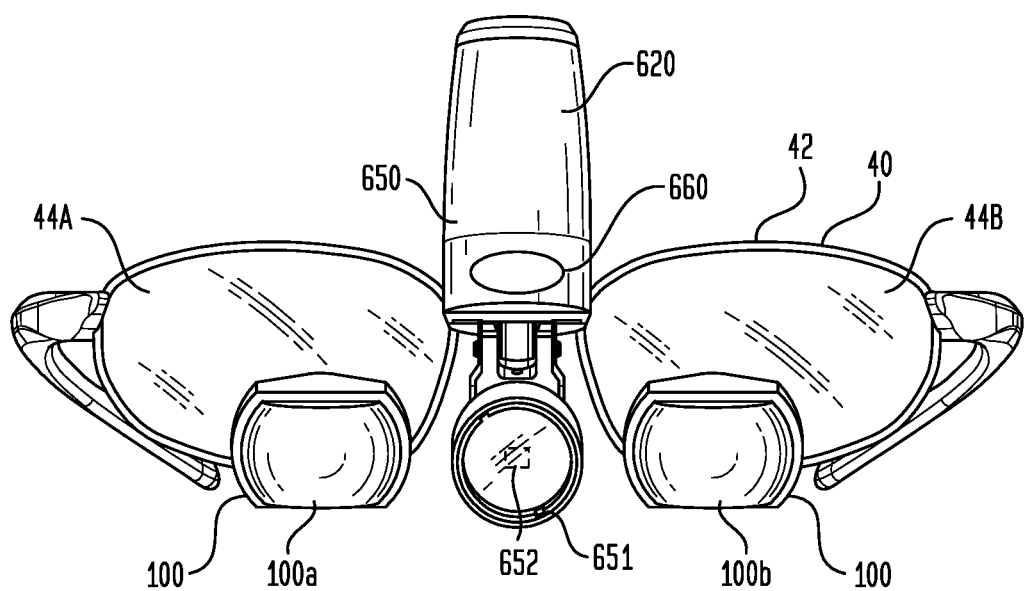
FIG. 6 illustrates a front view of an application of the exemplary magnification device in accordance with the principles of the invention.

FIG. 6 illustrates a front view of a second application of the exemplary magnification device disclosed herein.

In this illustrated second application, an eyewear 40 comprises frame 42, which is comprised of lens 44 (of which left and right lens are labelled 44a, 44b, respectively). Left and right lens 44a, 44b may be ordinary glasswear (e.g., plano lens) or may be prescriptive glasswear. Left lens 44a and right lens 44b may further be clear or tinted, wherein the tinting may be used to protect the eyes from stray light that may be damaging to the user. Although shown as an eyewear 40, it would also be recognized that a headband or a headset, which are well-known devices that may be used) for attaching the telescopic lens 100 and/or lighting elements to a user. Also illustrated are magnification devices (or telescopic lens) referred to as 100a, 100b, are attached to corresponding left and right lens, 44a, 44b, respectively.

Further illustrated is headlight assembly 650, comprising a battery pod 650 and housing 651. Housing 651 includes at least one light source (e.g., non-lasing LED and/or diode laser) 652. The housing 651 and the lighting source 652 are oriented to direct light generated by the lighting source 652 to an area that is substantially convergent with a focal point of telescopic lens 100a, 100b.

Contained within each of the telescopic lens 100a, 100b is the wavelength filtering system described herein. The filtering system within a corresponding telescopic lens 100a, 100b, attenuates any light generated by the lighting source 652 that may be reflected back into telescopic lens 100a, 100b.

Pod 620 contains a power source (i.e., a battery) that may be used to power the lighting source 652 and other electronic circuitry (not shown) that is used to control a voltage (or current) applied to the lighting source 652.

Further illustrated is a contact or contactless control means 660 for controlling the application of a voltage or current to light source 1152.

For example, the control means 660 may be configured to allow for a capacitive touch of metallic elements on pod 620 to apply/remove the voltage or current applied to the lighting source 652. In another aspect of the invention, control means 660 may be configured to allow for a non-contact control of the voltage (or current) applied to the lighting source 652.

For example, a non-contact control of the voltage (or current) may be achieved by the occurrence of a detection of a reflection of a signal, such as an infra-red, or an ultra-sonic, signal, that may be transmitted through a transmitter (not shown) and which is reflected by an object passing through the transmitted signal. A reflection of the transmitted signal may be detected by a receiver (or a detector, not shown). The receiver or detector may then generate an indication of the reflected signal to the electronic circuitry to apply or remove the voltage to light source 652.

Although the power source is shown attached to the eyewear, it would be recognized that the power source may be separated from the eyewear and those skilled in the art would have the knowledge to alter the configuration shown, herein, to provide power from a remote source to the lighting source without undue experimentation.

In accordance with one aspect of the invention, a practitioner may employ the eyewear 40 shown in FIG. 6, for example, to detect decay in tissues or cavities using, for example, an ultraviolet light. For example, a practitioner may illuminate a tissue using a lighting source operating in the 450-455 nm range, which when applied to tissue may distinguish healthy tissue from diseased tissue. Specifically, the diseased tissue, in response to its being illuminated by light in the 450-455 nm range, generates a light, by the process of self-fluorescence, at a second wavelength, e.g., 630 nm.

Accordingly, the filtering capability of filters 20, 22 disclosed, herein, may be determined for provide for the reduction (or removal) of the transmitted wavelengths (i.e., 450-455 nm) that may be reflected by illuminated objects to a safe level while allowing for the passage of light in a second (i.e., self-fluorescence) wavelength range.

In accordance with the principles of the invention, the filtering capability of filters 20 and 22 may be further tailored to provide improved visibility at one or more wavelengths. For example, in the dental arts, the practitioner may use materials to assist in the visualization of decay in the presence of healthy tissue In one aspect of the invention, a practitioner may apply a fluorescent dye to a patient's mouth, and when illuminated by a light in a known frequency range (e.g., ultra-violet), the dye and/or a bacteria on a diseased tissue or caries may fluoresce (or self-fluoresce) in response to be illuminated with a known wavelength. A plurality of exemplary fluorescent dyes and wavelengths that are suitable for use in the dental arts is tabulated in Table 3.

| Wavelength (nm) | Dye |
| --- | --- |
| 374-403 | 1, 3, 6, 8, Pyrenetertrasulfonic Acid Tetrasodium Salt |
| 494-520 | 5-Carboxyfluorescein Succinimidyl Ester |
| 341-377 | 1-Pyrenehexadeconoic Acid |
| 408-450 | 3-Cyano-7-Hydroxycoumarin |

Table 3:

Although specific fluorescence dyes are discussed, it would be recognized that the invention claimed is not limited to the specific dyes disclosed but may be applicable to other dyes, without altering the scope of the invention.

In accordance with the principles of the invention, filter 20 and 22 may be selected to provide attenuation of a selected range of wavelengths suitable for activating the fluorescent wavelength generated by the dye or bacteria with respect to the selected range of wavelengths, while allowing for the passage of wavelengths that are in a non-selected wavelength range.

For example, in one aspect of the invention, the at least one light source 652 may comprise at least one LED suitable for outputting a light below 500 nm wherein the filtering capabilities of filters 20 and 22 may be determined to block light wavelengths below 500 nm in accordance with the principles of the invention while allowing wavelengths above 500 nm to pass without attenuation.

In accordance with the principles of the invention, the filtering capabilities of filters 20 and 22 may be further prepared to provide for enhanced viewing capability of a wavelength range associated with a fluorescent wavelength(s) generated by the interaction of the transmitted light below 500 nm. For example, filters 20 and 22 may be formulated to reduce or block wavelengths less than and greater than a designated wavelength range. For example, filters 20 and 22 may be formulated to block wavelengths in ranges below 600 nm and above 650 nm, while allowing wavelengths associated with a fluoresce wavelength range (e.g., 630 nm as discussed above) to emphasize the fluorescence wavelength range.

In one aspect of the invention, the eyewear system 40 shown in FIG. 6, incorporating a filtering system in accordance with the principles of the invention, may comprise a lighting source 652 transmitting a light in a range of wavelengths about 405 nm, and a practitioner utilizing a dye of 5-Aminolevulinic acid (i.e., 5-ALA), provides a practitioner the ability to allow or enhance the viewability of a second wavelength while removing or reducing in magnitude any reflection of the transmitted light. For example, with the use of a 5-ALA dye and a transmitted wavelength in a range of 405 nm, filters 20, 22 may be formulated to reduce a magnitude of light below 500 nm, for example, while allowing light in a wavelength range of 630 nm, for example, to pass. Similarly, filters 20, 22 may be further formulated to remove or reduce in magnitude wavelengths above the wavelength range of 630 nm.

In accordance with another aspect of the invention, wherein the device 40 shown in FIG. 6, incorporating a filtering system in accordance with the principles of the invention, comprises a lighting source 652 may comprise a first lighting source (not shown) transmitting at a wavelength in a range of about 405 nm and a second lighting source (not shown) transmitting at a wavelength in a wavelength range about 450 nm, the filtering capability of filters 20, 22 may be selected to remove (or reduce in magnitude) reflections of the transmitted lights (i.e., 405 and 450) while allowing or enhancing the viewability of light at a second wavelength. For example, with the use of a 5-ALA dye and concurrent transmission of wavelengths in a range of about 405 nm and in a range of about 450 nm, filters 20, 22 may be formulated to reduce a magnitude of light in a range less than 475 nm while allowing or enhancing light in a wavelength range of 630 nm, for example, to pass. In one aspect of the invention, a magnitude of light transmitted in the wavelength range of about 450 may be significantly less than the magnitude of light transmitted in the wavelength range of about 405 nm.

In one aspect of the invention, the housing 651 may include at least one of each of an infra-Red LED, a visible LED, and a UV LED. A switch on housing 651 may be used to pre-select one of the at least one LED within a specific wavelength range. The selected at least one LED wavelength range may be selected based on a desired dye to be used.

In summary, a magnification device that provides for protection of a user's eyes from stray and harmful lighting while providing light within a desired wavelength range to pass has been disclosed. The magnification device incorporates a filtering system that includes elements having characteristics selected based on at least one of: an input power of light entering the magnification device, a position of the filters within the magnification device and a degree of magnification of the magnification device. Further disclosed is a system that incorporates the magnification device and a lighting source into a means for attaching the magnification device and the light source to the user. The lighting source is oriented such that the light (UV, visible, IR) may be directed to a working area, which is commensurate with a focal point of the magnification device. The filtering system, formulated in accordance with the principles of the invention, within the magnification device provides the user with protection from light harmful to the eyes that may be reflected from the working surface and viewed through the magnification device.

Although the invention disclosed herein discusses specific wavelengths that are produced with currently available LEDs (i.e., non-lasing light emitting diodes and laser diodes), it would be recognized that the specific wavelengths absorbed and/or reflected may be changed and/or added to without altering the scope of the invention. In addition, it would be known in the art that the specific wavelengths discussed herein represent a band of wavelengths centered on the wavelength values presented herein to account for divergence of the wavelength generated by the LED during the generation of the light and/or the operation of the LED, wherein the light generated is represented as a nominal value.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

What is claimed is:

1. A vision enhancing device, comprising:
   a frame configured to:
      attach to a user, said frame comprising;
         a first lens; and
         a second lens, each of said lens comprising:
            a lens filter, said lens filter configured to:
               block light in a first wavelength range within a wavelength range of light presented to said first lens and said second lens from exceeding a predetermined value, and
               allow light in a second wavelength range within said wavelength range presented to said first lens and said second lens to pass through; and
            a magnification device associated with each of said first lens and said second lens, said magnification device configured to:
         magnify said light presented to said first lens and said second lens and viewable through said magnification device, said magnification device comprising:
            a magnification filter comprising:
               a first magnification filter positioned at a distal end of said magnification device, said first magnification filter configured to:
                  attenuate said light in said first wavelength range to a residual magnitude; and
                  allow said light in said second wavelength range to pass through; and
               a second magnification filter positioned at a proximal end of said magnification device, wherein said second filter is configured to:
                  attenuate said residual magnitude in said first wavelength range after leaving said magnification device; and
                  allow said light in said second wavelength range to pass through.

2. The vision enhancing device of claim 1, wherein said magnification filter is configured to:
   absorb said light in said first wavelength range.

3. The vision enhancing device of claim 1, wherein said magnification filter is configured to:
   reflect said light in said first wavelength range.

4. The vision enhancing device according to claim 1, wherein said magnification filter is configured to:
   block a third wavelength range of said light within said wavelength range presented to said first lens and said second lens.

5. The vision enhancing device of claim 1, comprising:
   a light source, said light source selected from a group comprising at least one of: non-lasing light emitting diode and a lasing light emitting diode, wherein said light source is configured to:
      transmit a first light within said first wavelength range toward an object; and
   an electronic circuitry configured to:
      control an application of an electrical energy to said light source.

6. The vision enhancing device according to claim 5, wherein the first light is at least one of: an ultra-violet light, a visible light and an infra-red light.

7. The vision enhancing device according to claim 5, wherein said second wavelength range is based on an interaction of said first light with an object receiving said first light.

8. The vision enhancing device according to claim 5, wherein the second wavelength range is determined based on the first light interacting with a dye on said object.

9. A viewing device comprising:
   a lighting assembly configured to:
      generate a first light in a first wavelength range;
   an eyewear comprising:
      a first lens; and
      a second lens, each of said first lens and said second lens comprising:
         a lens filter, said lens filter configured to:
            block said first light through said first lens and said second lens; and
            allow passage of a second light through said first lens and said second lens, wherein said second light is generated by an interaction of said first light with a tissue; and
   a magnification device associated with each of said first lens and said second lens, said magnification device comprising:
      an objective lens; and
      an eye lens, said objective lens and said eye lens selected to achieve a level of magnification; and
   a magnification filtering system comprising:
      a first magnification filter comprising:
         a first optical density, wherein the first optical density is selected based on an input power of said first light inputted into said magnification device, and
      a second magnification filter comprising:
         a second optical density, wherein the second optical density is selected based on said first optical density and said level of magnification, wherein said magnification filtering system is configured to:
      block said first light through said magnification device; and
      allow passage of said second light through said magnification device, wherein said second light is within a second wavelength range, said second wavelength range being different than said first wavelength range.

\* \* \* \* \*